United States Patent [19]

Nagaishi

[11] 4,275,694
[45] Jun. 30, 1981

[54] ELECTRONIC CONTROLLED FUEL INJECTION SYSTEM

[75] Inventor: Hatsuo Nagaishi, Yokosuka, Japan

[73] Assignee: Nissan Motor Company, Limited, Yokohama, Japan

[21] Appl. No.: 72,436

[22] Filed: Sep. 4, 1979

[30] Foreign Application Priority Data

Sep. 27, 1978 [JP] Japan .................. 53-118848

[51] Int. Cl.³ ............................ F02M 41/00
[52] U.S. Cl. .................................. 123/463
[58] Field of Search ......... 123/32 EA, 32 EJ, 32 EB, 123/32 EC

[56] References Cited

U.S. PATENT DOCUMENTS

| | | | |
|---|---|---|---|
| 3,956,928 | 5/1976 | Barrera .............................. | 123/32 EJ |
| 4,121,549 | 10/1978 | Martin et al. .................... | 123/32 EA |
| 4,155,332 | 5/1979 | Yaegashi et al. ................ | 123/32 EA |
| 4,167,158 | 9/1979 | Martin et al. .................... | 123/32 EA |

Primary Examiner—Charles J. Myhre
Assistant Examiner—R. A. Nelli
Attorney, Agent, or Firm—Schwartz, Jeffery, Schwaab, Mack, Blumenthal & Koch

[57] ABSTRACT

An electronic controlled fuel injection system for use in an internal combustion engine is disclosed which comprises a Karman's vortex flow sensor for measuring the flow of air supplied to the engine to provide an intake air flow indicative signal, a flow deriving circuit responsive to throttle opening and engine speed measurements for deriving an intake air flow measurement to provide an intake air flow indicative signal, a control circuit for providing an injection pulse signal in synchronism with rotation of the engine, the injection pulse signal having its pulse width determined in accordance with the intake air flow measurement, and a signal selector responsive to engine operating condition for passing the intake air flow indicative signal from the Karman's vortex flow sensor to the control circuit when the engine is under low load conditions and for passing the intake air flow indicative signal from the flow deriving circuit to the control circuit when the engine is under high load conditions.

5 Claims, 7 Drawing Figures

ELECTRONIC CONTROLLED FUEL INJECTION SYSTEM

BACKGROUND OF THE INVENTION

1. Field of the Invention

This invention relates to an electronic controlled fuel injection system suitable particularly for use in an internal combustion engine including a small number of cylinders.

2. Description of the Prior Art

Electronic controlled fuel injection systems have already been incorporated in spark ignition type gasoline engines. Such a fuel injection system comprises means for measuring the flow of air introduced to the engine, and a control circuit responsive to the intake air flow measurement for providing an injection pulse signal to each fuel injection valve in synchronism with rotation of the engine, the injection pulse signal having its pulse width determined in accordance with the intake air flow measurement so that the fuel injection valve can inject a suitable amount of fuel to the cylinder to provide an optimum airfuel ratio. In such a fuel injection system, normally, an inclined-plate type air flow meter has been used to measure the flow of air introduced to the engine. However, such a air flow meter is complex in structure and expensive to produce.

In view of demand for simple and durable flow meters, Karman's vortex flow meters have attracted special interest recently. Karman's vortex flow meters utilize the fact that the frequency at which Karman's vortexes are generated by a columnar object disposed in fluid flow is proportional to the speed of travel of the fluid. However, if disturbance appears in the fluid flow due to suction vacuum pulsation, vortexes would be irregularly produced which results in error introduced into the intake air flow measurement. When an engine is operating at or near full throttle, the pulsation damping effect of the throttle valve is reduced and the suction vacuum pulsation is transmitted through the throttle valve to the upstream portion of the intake passage so that large error is introduced into the intake air flow measurement. This is true particularly in internal combustion engines of the type having a small number of cylinders since they produce relatively large suction vacuum pulsation.

SUMMARY OF THE INVENTION

It is therefore one object of the present invention to provide an improved fuel injection system which can provide a very accurate intake air flow measurement in a wide range of engine operating condition to achieve accurate air-fuel ratio control thereby improving fuel economy and exhaust emission characteristics.

Another object of the present invention is to provide an improved fuel injection system which is suitable particularly for use in an internal combustion engine having a small number of cylinders.

Still another object of the present invention is to provide an improved fuel injection system which is inexpensive to produce.

According to the present invention, these and other objects are accomplished by an electronic controlled fuel injection system for use in an internal combustion engine having an intake passage provided therein with a throttle valve, comprising a Karman's vortex flow sensor located in the intake passage upstream of the throttle valve for measuring the flow of air supplied to the engine to provide an intake air flow indicative signal, a throttle opening sensor associated with the throttle valve for measuring the degree of opening of the throttle valve, a speed sensor for measuring the speed of rotation of the engine, a flow deriving circuit responsive to the throttle opening and engine speed measurements for deriving an intake air flow measurement to provide an intake air flow indicative signal, a fuel supply control circuit responsive to an intake air flow measurement for providing an injection pulse signal in synchronism with rotation of the engine, the injection pulse signal having its pulse width determined in accordance with the intake air flow measurement, and a signal selector responsive to engine operating conditions for passing the intake air flow indicative signal from the Karman's vortex flow sensor to the fuel supply control circuit when the engine is under low load conditions and for passing the intake air flow indicative signal from the flow deriving circuit to the fuel supply control circuit when the engine is under high load conditions.

Other objects, means, and advantages of the present invention will become apparent to one skilled in the art thereof from the following description.

BRIEF DESCRIPTION OF THE DRAWINGS

The following explanation of several preferred embodiments of the present invention will help in the understanding thereof, when taken in conjunction with the accompanying drawings, which, however, should not be taken as limiting the present invention in any way, but which are given for purposes of illustration only. In the drawings, like parts are denoted by like reference numerals in the several figures, and.

DESCRIPTION OF THE PREFERRED EMBODIMENTS

Figure 1:
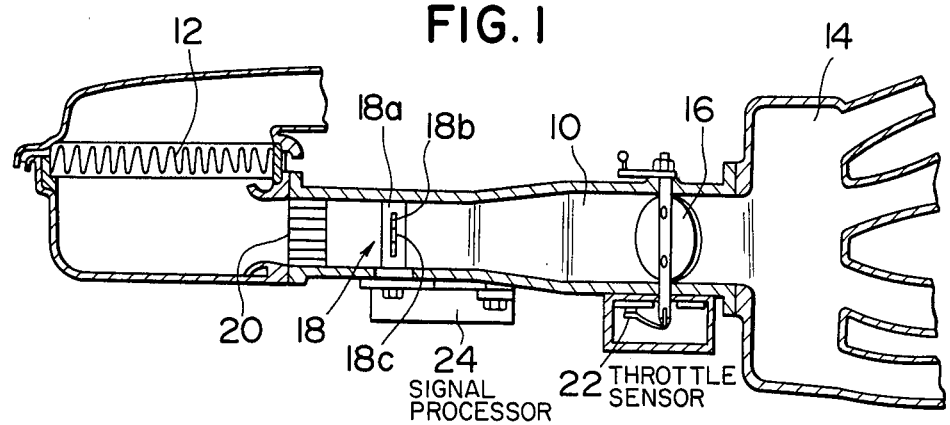
FIG. 1 is a sectional view of an engine intake system in which a Karman's vortex flow sensor is incorporated.

Referring now to FIG. 1, there is illustrated an intake system which comprises an intake passage 10 connected at its one end to the atmospheric air through an air cleaner 12 and connected at the opposite end to an engine intake manifold 14 leading to the four cylinders of an internal combustion engine. The intake passage 10 contains a throttle valve 16, a Karman's vortex flow sensor 18 upstream of the throttle valve 16, and an air stream regulator 20 located upstream of the Karman's vortex flow sensor 18 for regulating the stream of intake air. A throttle opening sensor 22, which may be in the form of a potentiometer, is drivingly associated with the throttle valve 16 for measuring the degree of opening of the throttle valve 16.

The Karman's vortex flow sensor 18 comprises a columnar member 18a formed therein with a through-hole 18b, and a thin hot wire 18c. When fluid separation occurs alternatively on the opposite side surfaces of the columnar member 18a to produce Karman's vortexes, air flow appear in the through-hole 18b, whereby the hot wire 18c is cooled and has its resistance changed. A signal caused by such a resistance change is applied to a signal processing circuit 24 where its waveform is shaped.

Figure 2:
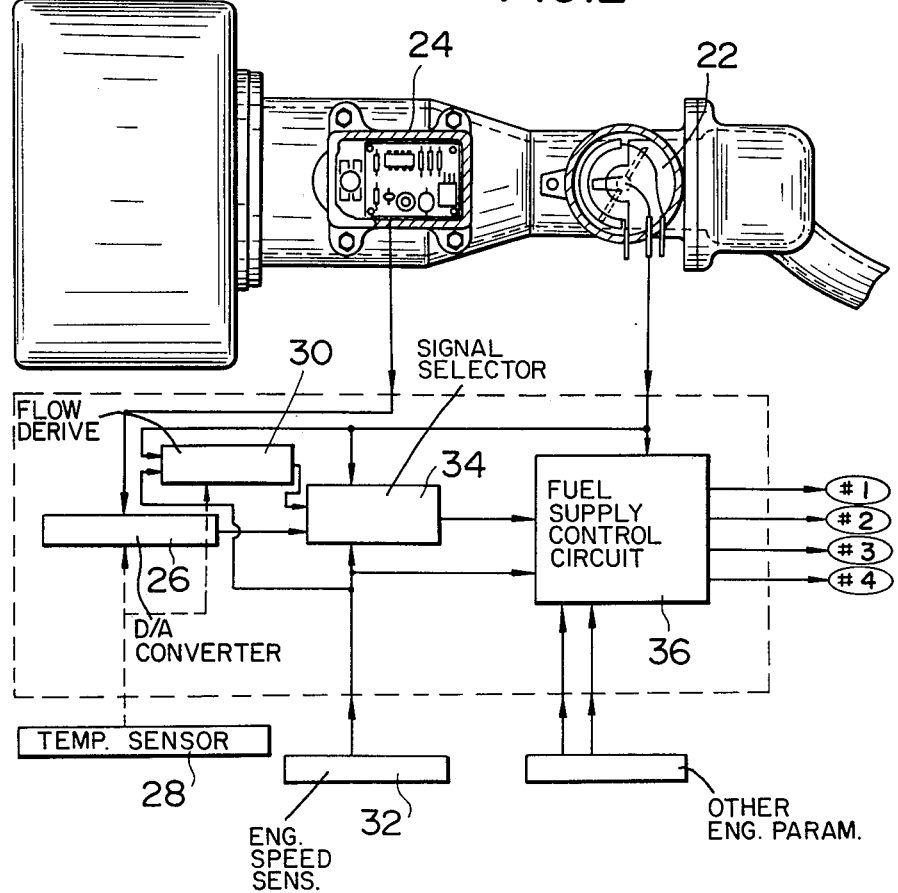
FIG. 2 is a block diagram showing one embodiment of a fuel injection system made in accordance with the present invention.

As shown in FIG. 2, the output of the signal processing circuit 24 is coupled to a D/A converter 26 where it is converted from digital form into analog form. The converter 26 responds to atmospheric pressure and intake air temperature measurements for correcting the volume measurement of intake air flow to a mass flow measurement. For this purpose, the D/A converter 26 has an input from an atmospheric pressure and intake air temperature sensor 28. A flow deriving circuit 30 is provided which has inputs from the throttle opening sensor 22 and an engine speed sensor 32 for deriving an intake air flow measurement in accordance with the throttle opening and engine speed measurements. The circuit 30 responds to atmospheric pressure and intake air temperature measurements for correcting the volume measurement of intake air flow to a mass flow measurement. For this purpose, the flow deriving circuit 30 has an additional input from the atmospheric pressure and intake air temperature sensor 28. The reference voltage levels of the D/A converter 26 and the flow deriving circuit 30 are selected to be equal to each other.

The outputs of the D/A converter 26 and the flow deriving circuit 30 are coupled to a signal selector 34 which responds to throttle opening and engine speed measurements for selecting one of the intake air flow indicative signals fed thereto from the D/A converter 26 and the flow deriving circuit 30. Thus, the signal selector 34 has additional inputs from the throttle opening sensor 22 and the engine speed sensor 32. The output of the signal selector 34 is coupled to a fuel supply control circuit 36 which responds to the intake air flow indicative signal for providing an injection pulse signal to the fuel injection valve of each of cylinders #1 to #4 in synchronism with rotation of the engine, the injection pulse signal having its pulse width corresponding to the intake air flow measurement and corrected in accordance with various engine operating conditions such as throttle opening, engine speed and cooling water temperature so that the fuel injection valve can inject a suitable amount of fuel to the cylinder to provide an optimum air-fuel ratio.

Figure 3:
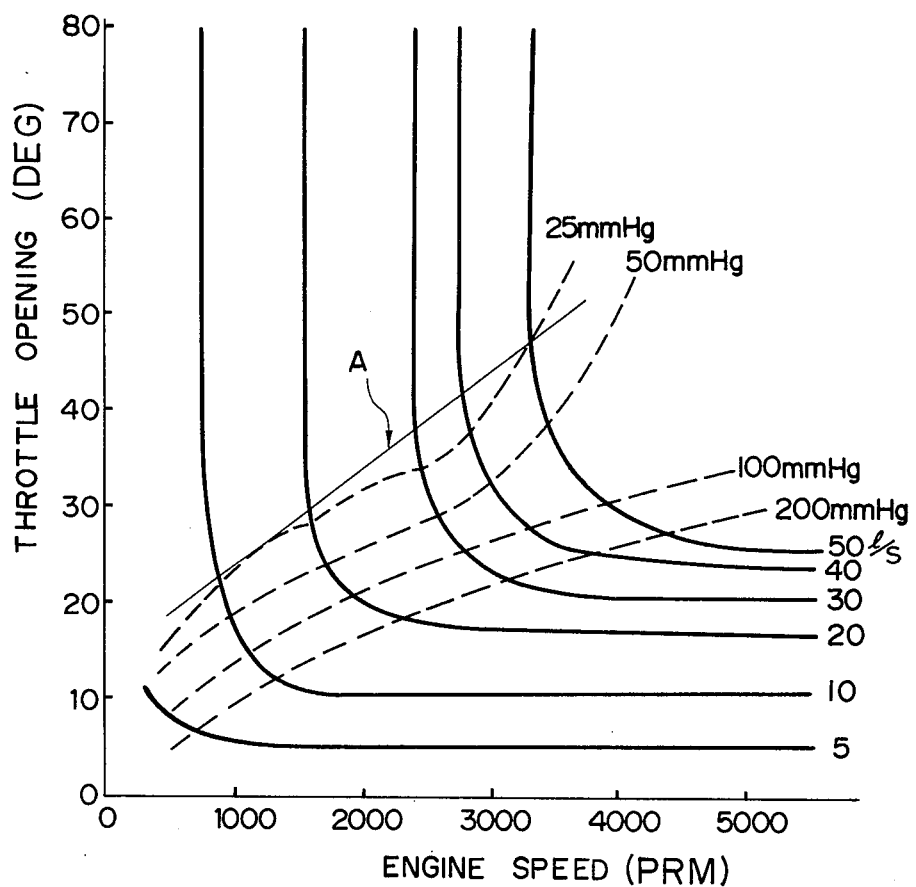
FIG. 3 is a graph of throttle opening versus engine speed which is used to explain the operation of the signal selector.
Figure 4:
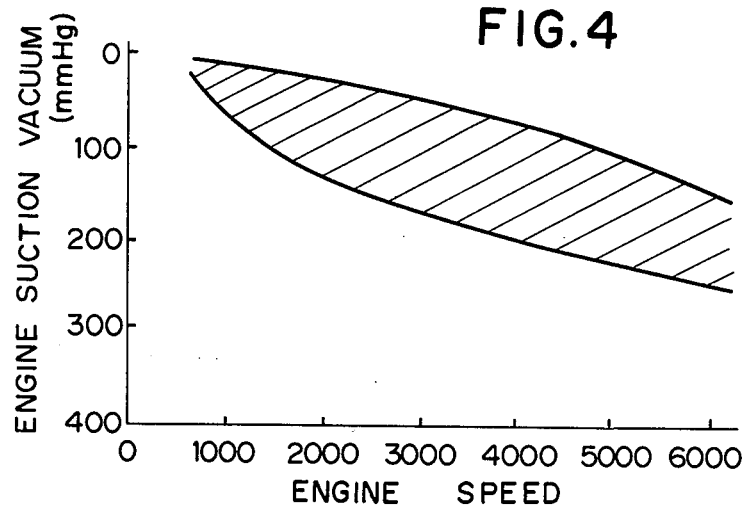
FIG. 4 shows the region where the accuracy of intake air flow measurement of the Karman's vortex flow sensor is unreliable.

FIG. 3 is a graph plotting throttle opening with respect to given engine speed, in which the solid-line curves relate to various intake air flows and the broken-line curves relate to various engine suction vacuums. As can be seen in FIG. 3, intake air flow substantially corresponds to engine speed and thus can be derived only from engine speed or can be derived with great accuracy from engine speed and throttle opening when the engine is operating under high load conditions or in the region above line A where the accuracy of intake air flow measurement of the Karman's vortex flow sensor 18 is low due to suction vacuum pulsation as set forth previously. On the other hand, the Karman's vortex flow sensor 18 can provide a very accurate intake air flow measurement without any disturbance introduced into its output waveform when the engine is operating under low load conditions or in the region below line A. Accordingly, a very accurate intake air flow measurement can be achieved in a wide range of engine operating condition by designing the signal selector 34 such that it responds to throttle opening and engine speed measurements for passing the intake air flow indicative signal from the D/A converter 26 to the fuel supply control circuit 36 when the engine is operating in the region below line A and for passing the intake air flow indicative signal from the flow deriving circuit 30 to the fuel supply control circuit 36 when the engine is operating in the region above line A. FIG. 4 is a graph of engine suction vacuum versus engine speed. The hatched area of FIG. 4 indicates the region where the accuracy of intake air flow measurement of the Karman's vortex flow sensor 18 is low due to suction vacuum pulsation. This region is at or near full throttle.

It is also realized in FIG. 3 that engine suction vacuum may be utilized to judge whether the engine is operating under low or high load conditions, i.e., in the region below or above line A.

Figure 5:
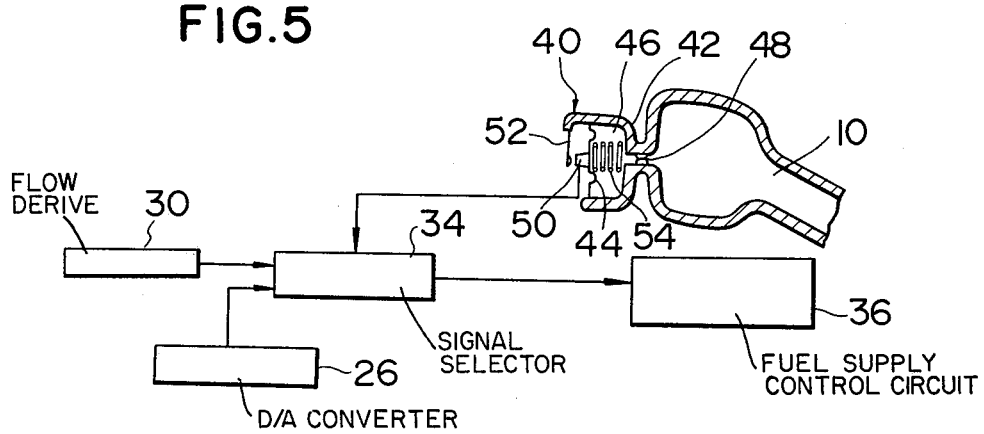
FIG. 5 is a view partly in section and partly in block diagram of a second embodiment of the present invention where the signal selector is associated with a pressure sensitive switch.

Referring to FIG. 5, there is illustrated a pressure responsive switch 40 which is responsive to engine suction vacuum for detecting whether or not the engine suction vacuum is below or above a predetermined level. The pressure responsive switch 40 comprises a switch housing 42, a diaphragm 44 extending across the interior of the switch housing 42 to provide a vacuum chamber 46 which is connected through an orifice 48 to the intake passage 10 downstream of the throttle valve 16, a movable contact 50 mounted on the surface of the diaphragm 44 oposite to the vacuum chamber 46, a stationary contact 52 located to face the movable contact 50, and a bias spring 54 biasing the diaphragm 44 toward the stationary contact 52 (leftwardly as viewed in FIG. 5) so as to bring the movable contact 50 into the stationary contact 52 to provide a control signal to the signal selector 34 when the engine suction vacuum is below a predetermined level (for example, 25 mmHg). When the engine suction vacuum becomes above the predetermined level, the diaphragm 44 is attracted rightwardly against the force of the bias spring 54 so as to bring the movable contact 50 out of contact with the stationary contact.

Figure 6:
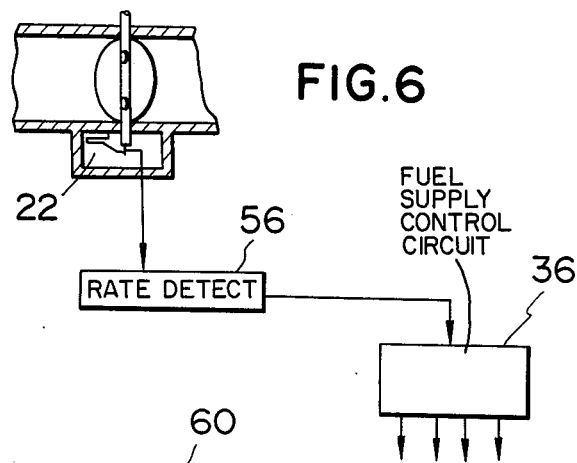
FIG. 6 is a block diagram showing a sensor for measuring the rate of change in throttle opening.

Referring to FIG. 6, there is illustrate a throttle opening change rate detecting circuit 56 which measures the rate of change in throttle opening per unit time to provide a throttle opening change rate indicative signal to the fuel supply control circuit 36 so as to correct the pulse width of the injection pulse signal in accordance with the throttle opening change rate measurement thereby increasing the air-fuel ratio control accuracy.

If a very thin hot wire is used as an element of the Karman's vortex flow sensor 18, there would be a possibility of breakage of the hot wire 18c so that any air-fuel ratio control cannot be effected in the fuel injection system when the engine is under low load conditions.

Figure 7:
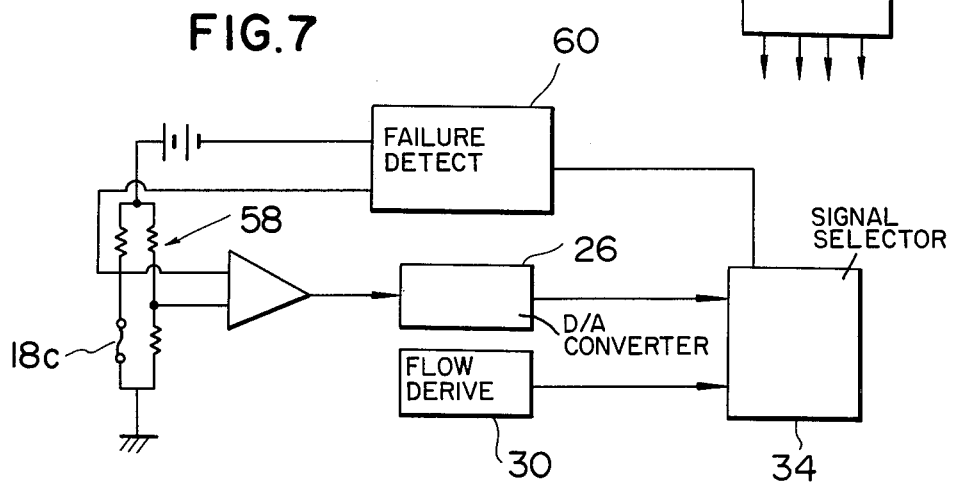
FIG. 7 is a block diagram showing a safety device for detecting failure of the Karman's vortex flow sensor.

Referring to FIG. 7, there is illustrated a safety device for detecting breakage of the hot wire 18c to place the signal selector 34 into a state passing the intake air flow indicative signal from the flow deriving circuit 30 to the fuel supply control circuit regardless of engine operating conditions. The safety device comprises three registors constituting a resistive bridge circuit 58 along with the hot wire 18c of the Karman's vortex flow sensor 18, and a failure detecting circuit 60 responsive to a voltage change occurring upon breakage of the hot wire 18c for providing a command signal to the signal selector 34. It is preferable to provide alarm means responsive to the command signal for providing an alarm to notice the breakage of the hot wire to the driver.

It is, therefore, apparent from the foregoing that there has been provided, in accordance with the present invention, an electronic controlled fuel injection system where the amount of fuel injected to the engine is controlled in accordance with an intake air flow measurement provided by a Karman's vortex flow sensor when the engine is operating under low load conditions or an intake air flow measurement derived from throttle opening and engine speed measurements when the engine is operating under high load conditions. The fuel injection system of the present invention permits very accurate fuel supply control to improve fuel economy and exhaust emission characteristics and eliminates the need for any expensive air flow sensor. In addition, it is suitable for use in an internal combustion engine having a small number of cylinders where relatively large suction vacuum pulsation appears since the Karman's vortex flow sensor output is used only when the engine is operating under low load conditions.

What is claimed is:

1. A fuel supply system for use in an internal combustion engine having an intake passage and a throttle valve therein, said system comprising:
   (a) means for supplying a controlled amount of fuel to said engine in accordance with intake air flow rate;
   (b) a Karman's vortex flow meter located in said intake passage upstream of said throttle valve for providing a first signal corresponding to the rate of air flow through said intake passage;
   (c) means, responsive to engine rotational speed and throttle position, for providing a second signal corresponding to the rate of air flow through said intake passage; and
   (d) a signal selector means for connecting one of said signals to said fuel supply means, said selector means normally connecting said first signal to said fuel supply means, said selector means connecting said second signal to said fuel supply means when the engine load exceeds a predetermined value.

2. A fuel supply system according to claim 1, which further comprises circuit means responsive to a failure of said Karman's vortex flow meter, for forcing said signal selector means to connect said second signal to said fuel supply means regardless of engine load conditions.

3. A fuel supply system according to claim 2, wherein said circuit means includes means for providing an alarm when a failure occurs in said Karman's vortex flow meter.

4. A fuel supply system according to claim 1, wherein said signal selector means further includes means for connecting said second signal to said fuel supply means only when the degree of opening of said throttle valve exceeds a predetermined value.

5. A fuel supply system according to claim 1, wherein said signal selector means further includes means for connecting said second signal to said fuel supply means only when the vacuum appearing in said intake passage downstream of said throttle valve exceeds a predetermined value.

* * * * *